(12) United States Patent
Stewart et al.

(10) Patent No.: US 6,880,983 B2
(45) Date of Patent: Apr. 19, 2005

(54) OPTOELECTRONIC MODULE WITH THERMALLY ISOLATED COMPONENTS

(75) Inventors: James Stewart, San Jose, CA (US); Jan Lipson, Cupertino, CA (US)

(73) Assignee: Finisar Corporation, Sunnyvale, CA (US)

( * ) Notice: Subject to any disclaimer, the term of this patent is extended or adjusted under 35 U.S.C. 154(b) by 20 days.

(21) Appl. No.: 10/101,247

(22) Filed: Mar. 18, 2002

(65) Prior Publication Data

US 2003/0044131 A1 Mar. 6, 2003

Related U.S. Application Data

(60) Provisional application No. 60/317,836, filed on Sep. 6, 2001.

(51) Int. Cl.[7] ................................................ G02B 6/36
(52) U.S. Cl. ............................ 385/92; 385/88; 385/94
(58) Field of Search ...................................... 385/88–94

(56) References Cited

U.S. PATENT DOCUMENTS

| | | | | |
|---|---|---|---|---|
| 4,627,687 A | * | 12/1986 | Dorn et al. | 385/94 |
| 4,770,486 A | * | 9/1988 | Wang et al. | 385/92 |
| 4,997,243 A | * | 3/1991 | Aiki et al. | 385/92 |
| 5,452,392 A | * | 9/1995 | Baker et al. | 385/92 |
| 5,845,031 A | * | 12/1998 | Aoki | 385/92 |
| 6,146,025 A | * | 11/2000 | Abbink et al. | 385/88 |
| 6,487,027 B1 | * | 11/2002 | Yamauchi et al. | 359/820 |
| 2002/0164131 A1 | * | 11/2002 | Yoshimura et al. | 385/88 |

* cited by examiner

*Primary Examiner*—Rodney Bovernick
*Assistant Examiner*—Sung Pak
(74) *Attorney, Agent, or Firm*—Workman Nydegger

(57) ABSTRACT

A temperature-controlled optoelectronic module that includes a module housing, a laser mount structure for affixing a laser package in the module housing, an optical fiber receptacle structure disposed adjacent to the laser mount structure, a thermal isolator affixed between the laser mount structure and the optical fiber receptacle structure, and a temperature controller coupled to the laser mount structure and operable to regulate temperature of the laser package is disclosed. In the absence of the thermal isolator, a "thermal short" may be created between the module housing and the laser package, substantially reducing the efficiency of the temperature controller. The presence of the thermal isolator eliminates the "thermal short," substantially increases the effectiveness of the temperature controller and enables the miniaturization of temperature-controlled optoelectronic transceiver modules.

14 Claims, 6 Drawing Sheets

OPTOELECTRONIC MODULE WITH THERMALLY ISOLATED COMPONENTS

The present application claims priority to U.S. provisional patent application 60/317,836 filed Sep. 6, 2001, which is hereby incorporated by reference.

RELATED APPLICATIONS

The present application is related to co-pending U.S. non-provisional application Ser. No. 10/101,260 entitled Compact Laser Package With Integrated Temperature Control, filed herewith and, co-pending U.S. non-provisional application Ser. No. 10/101,248 entitled Control Circuit for Optoelectronic Module with Integrated Temperature Control, filed herewith. These related applications are hereby incorporated by reference.

BRIEF DESCRIPTION OF THE INVENTION

The present invention is generally related to optoelectronic devices. More specifically, the present invention pertains to an optoelectronic module having thermally isolated components.

BACKGROUND OF THE INVENTION

It is known that varying the temperature of a laser emitter may affect the wavelength ($\lambda$) of the emitted light. In applications where the wavelength of the laser is not critical, it is not important to precisely control the temperature of the laser emitter, and a heat sink is usually sufficient for cooling the laser emitter. However, in some applications such as Dense Wavelength Division Multiplexing (DWDM), it is important to produce light at precise wavelengths and to maintain the laser emitter at precise temperatures. For those applications, a heat sink alone is not sufficient.

Some conventional laser packages contain a large built-in temperature controller to control the temperature of the laser emitter. Some laser packages even contain an elaborate built-in coolant-circulation system for cooling the laser emitter (e.g., a laser diode). Such conventional laser emitter packages, due to their large size, cannot be easily incorporated within pluggable fiber optic transceiver modules, which typically have strict form factor requirements. Miniaturizing the built-in temperature controller, unfortunately, is not an ideal solution because small temperature controllers may not have the necessary heat transfer capability.

Accordingly, there exists a need for an apparatus for precisely controlling the temperature of a laser emitter without using a laser package that contains a large built-in temperature controller such that temperature control functionality can be implemented in an optoelectronic transceiver or transmitter module.

SUMMARY OF THE INVENTION

An embodiment of the present invention is a thermally-regulated optoelectronic transceiver module that conforms with industry standard form factors. The optoelectronic transceiver module in this embodiment utilizes a conventional transistor outline ("TO") laser package, sometimes called a "TO can." The TO laser package is disposed in a module housing that conforms to a predetermined form factor (e.g., the GBIC transceiver form factor). Within the module housing, the optoelectronic transceiver module includes a temperature controller operable to regulate the temperature of the laser package. The optoelectronic transceiver module further includes a thermal isolator that thermally isolates the TO laser package from some of the optically passive and temperature insensitive components.

In the absence of the thermal isolator, the temperature controller regulates the temperature of the entire optoelectronic transceiver module including the temperature insensitive components. The presence of the thermal isolator eliminates the need for heating or cooling temperature insensitive components and thereby substantially increases the effectiveness of the temperature controller. The increased effectiveness allows the use of temperature controllers that use less power and that are compact enough to fit into pluggable transceiver or transmitter modules.

In one embodiment of the present invention, the thermal isolator is a piece of ceramic with low thermal conductivity disposed between a laser mount structure and an optical fiber receptacle structure. In other embodiments, the thermal isolator may include a plurality of round elements that are made of a ceramic material with low thermal conductivity. Additional thermal isolation may be achieved by using spacing elements to reduce the contact area between the optical fiber receptacle structure and the module housing and by using spacing elements to eliminate direct contact between a set of screws and the laser mount structure.

BRIEF DESCRIPTION OF THE DRAWINGS

For a better understanding of the invention, reference should be made to the following detailed description taken in conjunction with the accompanying drawings, in which.

DESCRIPTION OF THE PREFERRED EMBODIMENTS

Preferred embodiments of the invention are described below. In the interest of clarity, not all features of an actual implementation are described. It will be appreciated that in the development of any such implementation, numerous implementation-specific decisions must be made to achieve the developers' specific goals, such as compliance with system-related and business-related constraints and compliance with the constraints of various existing and yet to be determined form factors. Moreover, it will be appreciated that such a development effort might be complex and time-consuming, but would nevertheless be a routine undertaking for those of ordinary skill in the art having the benefit of this disclosure.

Figure 1:
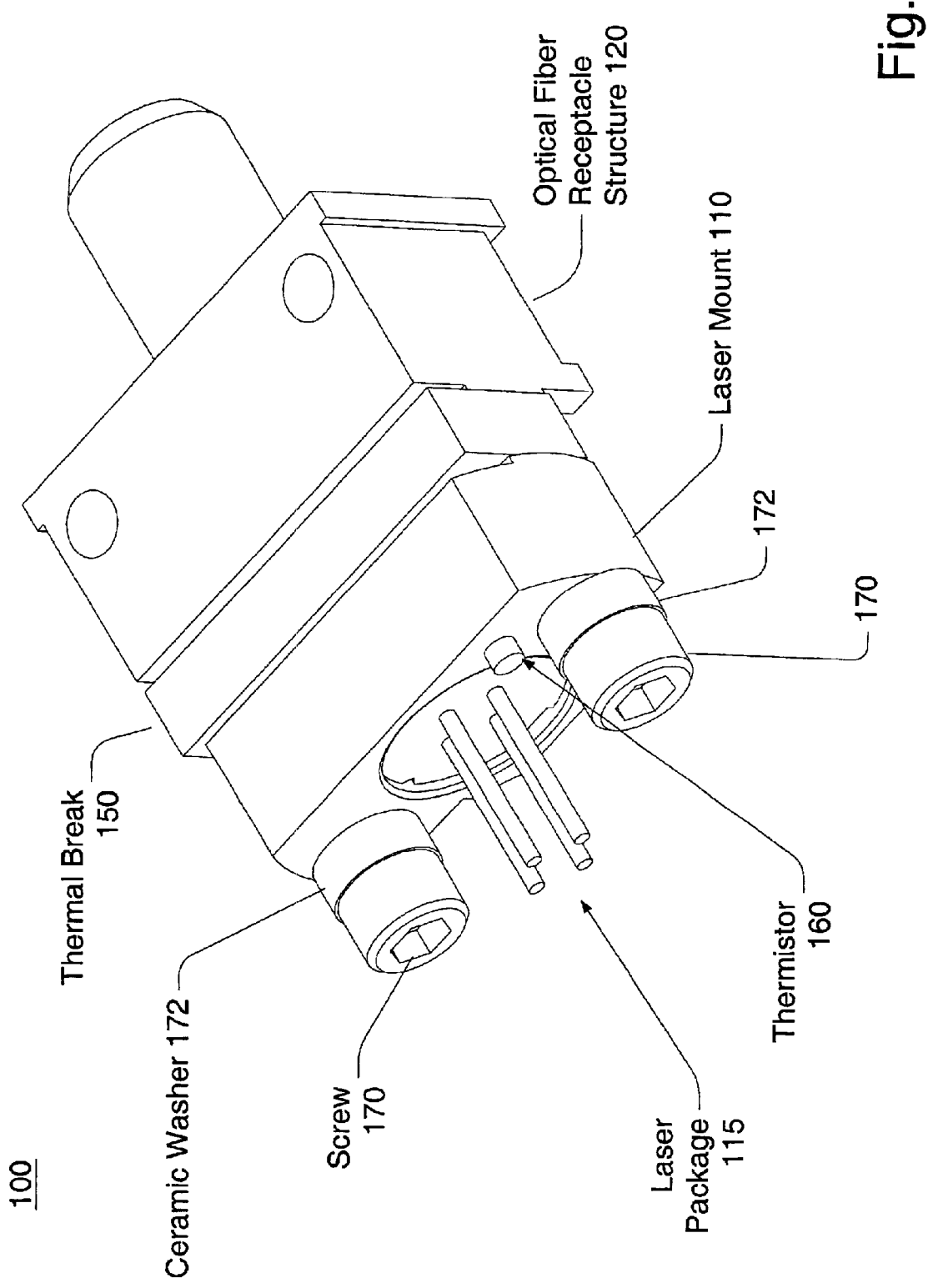
FIG. 1 depicts a perspective view of a Transmitter Optical SubAssembly (TOSA) in accordance with an embodiment of the present invention.
Figure 2:
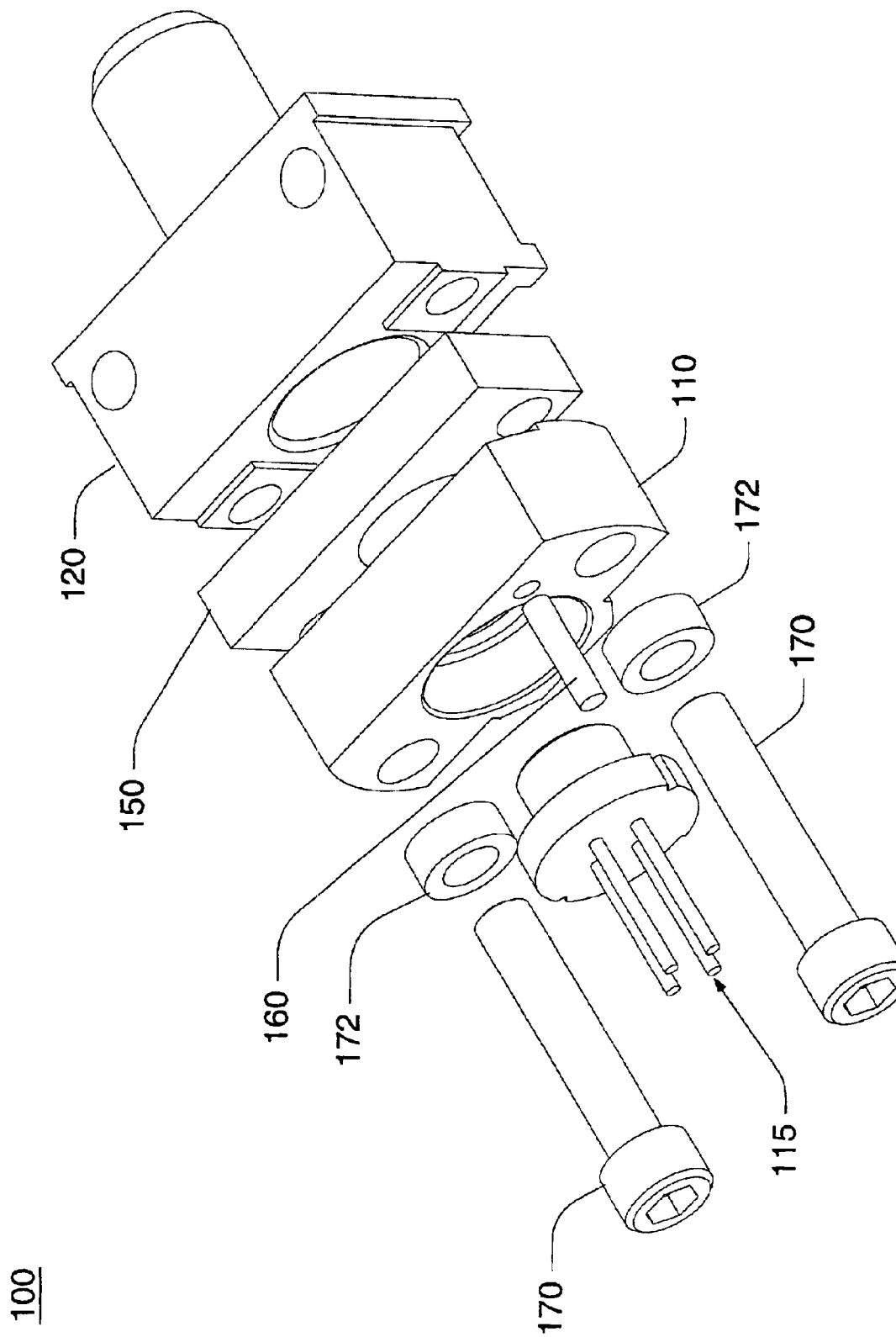
FIG. 2 depicts an exploded view of the TOSA of FIG. 1.
Figure 3:
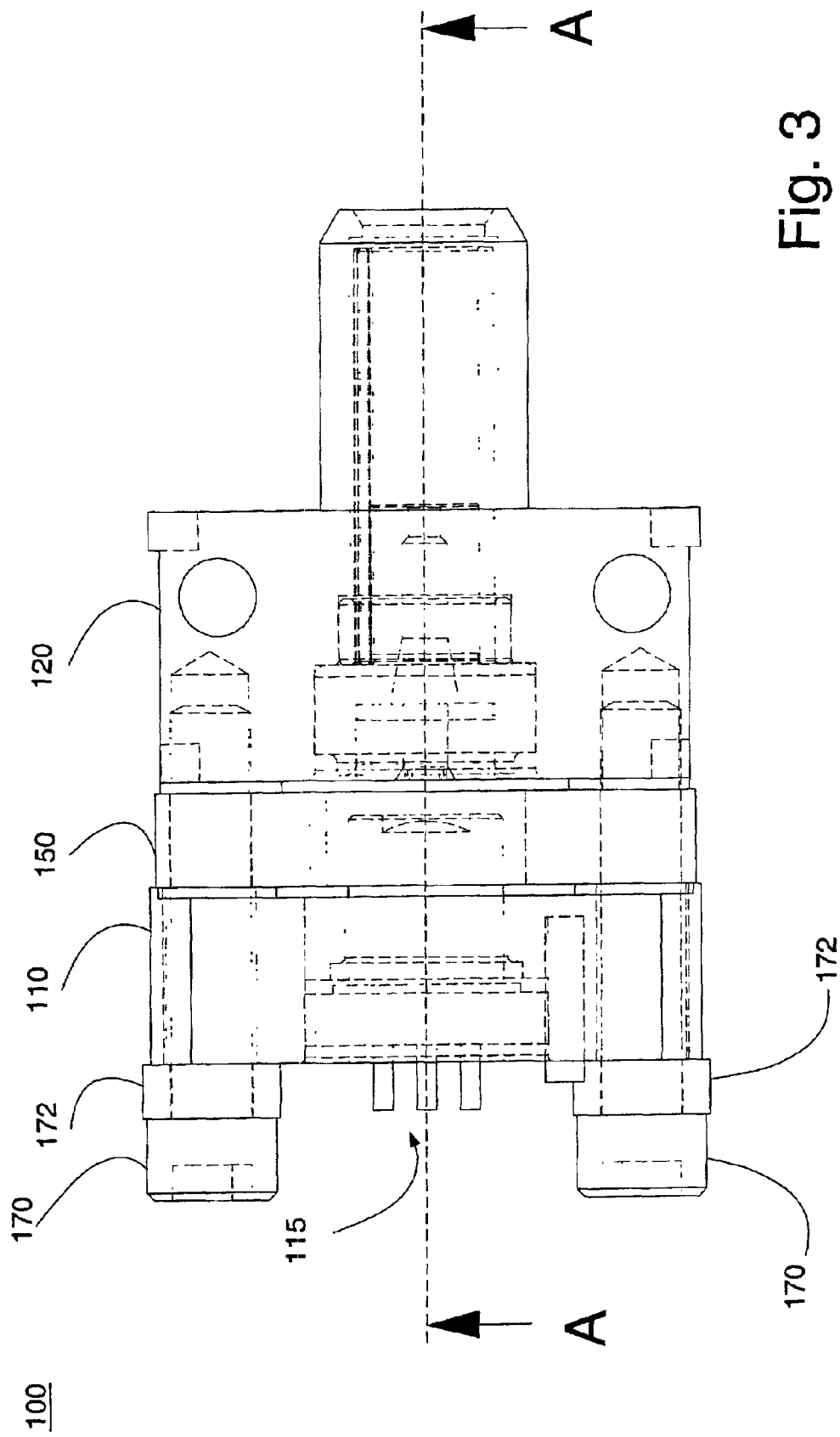
FIG. 3 depicts a top view of the TOSA of FIG. 1.
Figure 4:
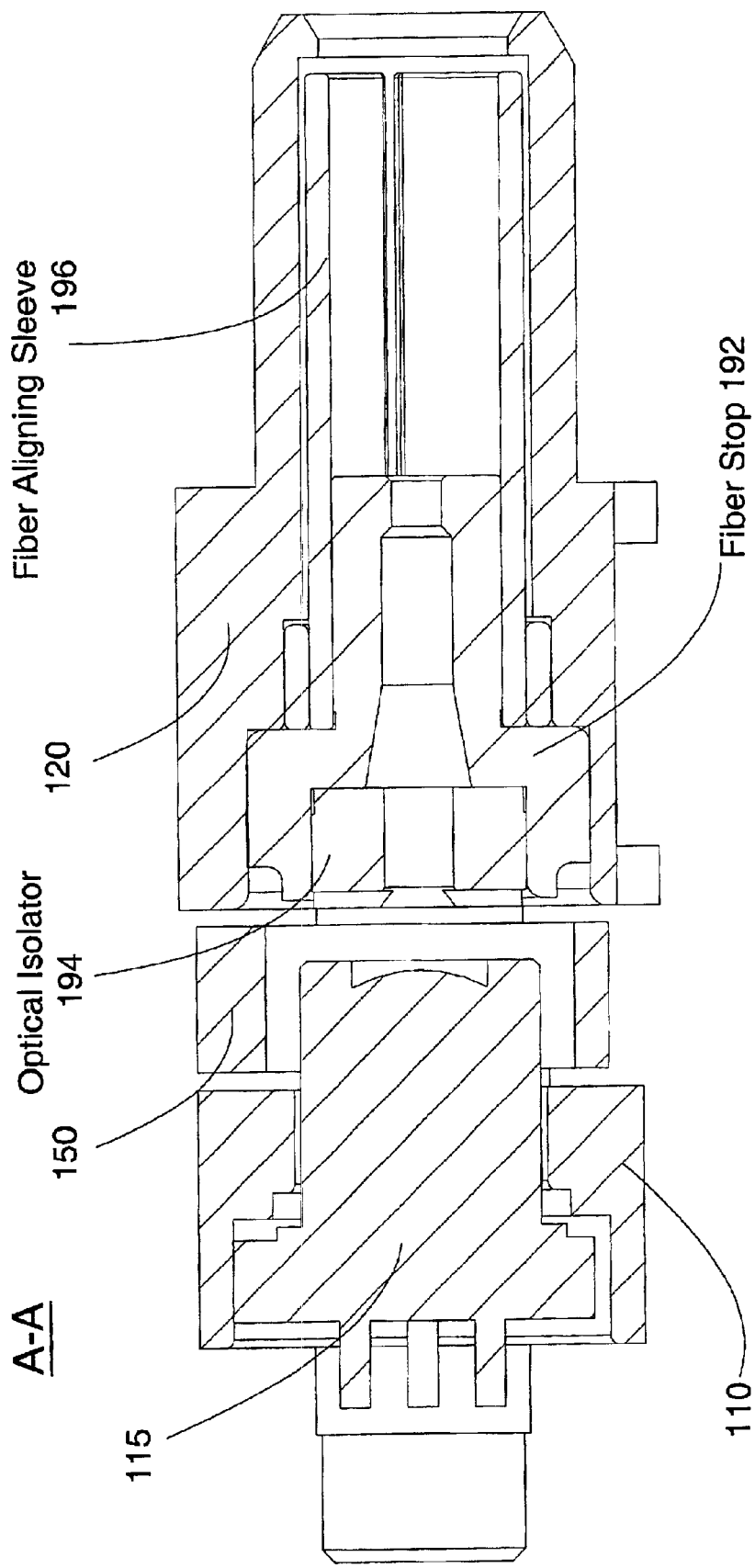
FIG. 4 depicts a side cross-sectional view of the TOSA of FIG. 1.
Figure 6:
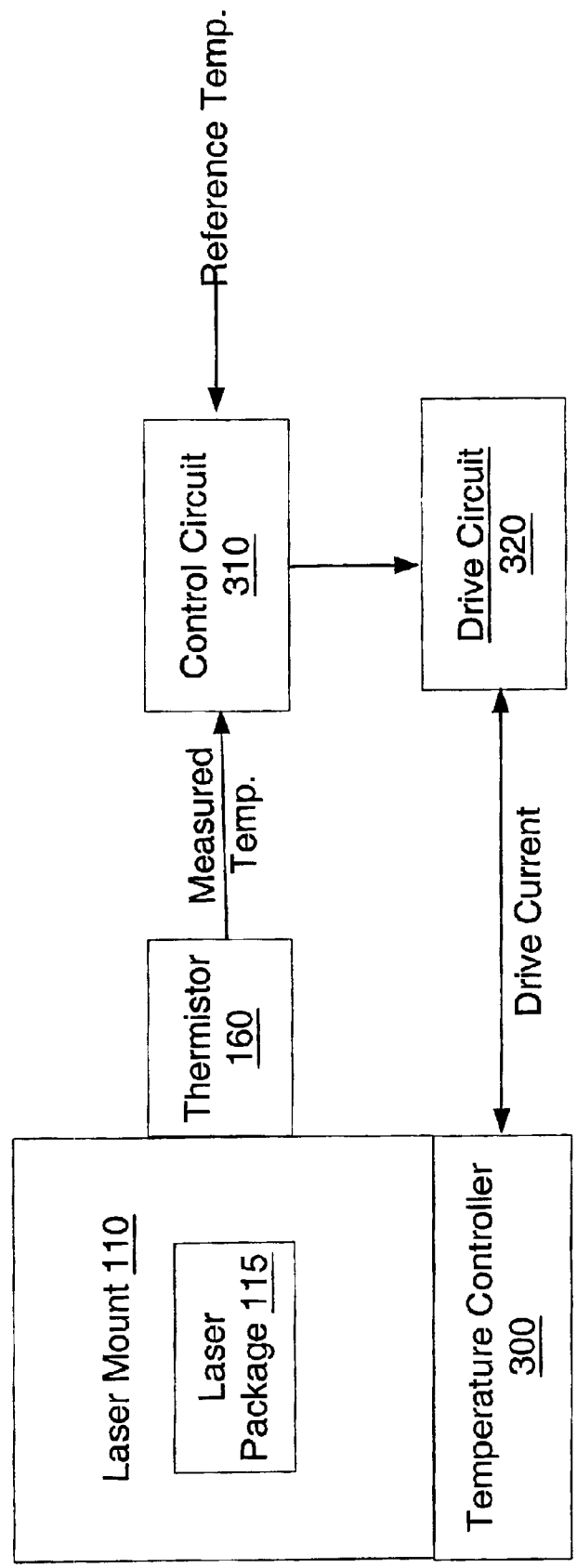
FIG. 6 is a block diagram depicting circuitry that may be used in accordance with an embodiment of the invention.

FIGS. 1, 2 and 3 depict, respectively, a perspective view, an exploded view, and a top view of a Transmitter Optical SubAssembly (TOSA) 100 according to an embodiment of the present invention. FIG. 4 depicts a cross-sectional view of the TOSA 100. The plane upon which the cross-sectional view is taken is indicated on FIG. 3 by broken line A—A. As shown in these figures, the TOSA 100 includes a laser mount structure 110 and an optical fiber receptacle structure 120. Mounted on the laser mount structure 110 is a transistor outline (TO) laser package 115, which contains a laser emitter 116 (FIG. 6). The optical fiber receptacle structure 120 includes a fiber aligning sleeve 196 and a fiber stop 192 for receiving and aligning an optical fiber with the laser package 115. In this embodiment, the optical fiber receptacle structure 120 further includes an optical isolator 194 for preventing light from reflecting back into the laser package 115. In some embodiments, the optical fiber receptacle structure 120 may include a lens that focuses light emitted from the laser package 115. For mechanical stability, both the laser mount structure 110 and the optical fiber receptacle structure 120 are preferably made of stainless steel.

In the present discussion, a laser emitter is a temperature sensitive and optically active component. Furthermore, in the present discussion, optically passive components include optical fibers, optical fiber receptacle structures, and laser mount structures.

With reference still to FIGS. 1–4, at least one portion of the laser mount structure 110 is separated from the optical fiber receptacle structure 120 by a thermal break 150, also herein called a thermal isolator. In the illustrated embodiment, the thermal break 150 is formed from a piece of ceramic with low thermal conductivity. In other implementations, the thermal break 150 includes a piece of ceramic with low thermal conductivity, as well as other materials. In some embodiments, the thermal break 150 may include a plurality of spacing elements that are made of poor thermal conductors, such as ceramic balls. The presence of the thermal break 150 substantially reduces heat flow between the laser mount structure 110 and the optical fiber receptacle structure 120.

Also illustrated in FIGS. 1–3 are screws 170 for securing the laser mount structure 110, the optical fiber receptacle structure 120 and the thermal break 150 together. In some embodiments, other securing means, such as epoxy, may be used to secure these components together. In order to reduce heat flow between the laser mount structure 110 and the optical fiber receptacle structure 120 via the screws 170, ceramic washers 172 are used in the present embodiment to reduce or eliminate direct contact between the screws 170 and the laser mount structure 110. FIGS. 1–3 also illustrate a thermistor 160 disposed adjacent to the laser package 115 for detecting the laser package's temperature. For most applications, the laser package's temperature is a sufficiently close approximation of that of the laser emitter contained therein to allow the use of a thermistor outside the laser package for accurate temperature control of the laser.

Figure 5:
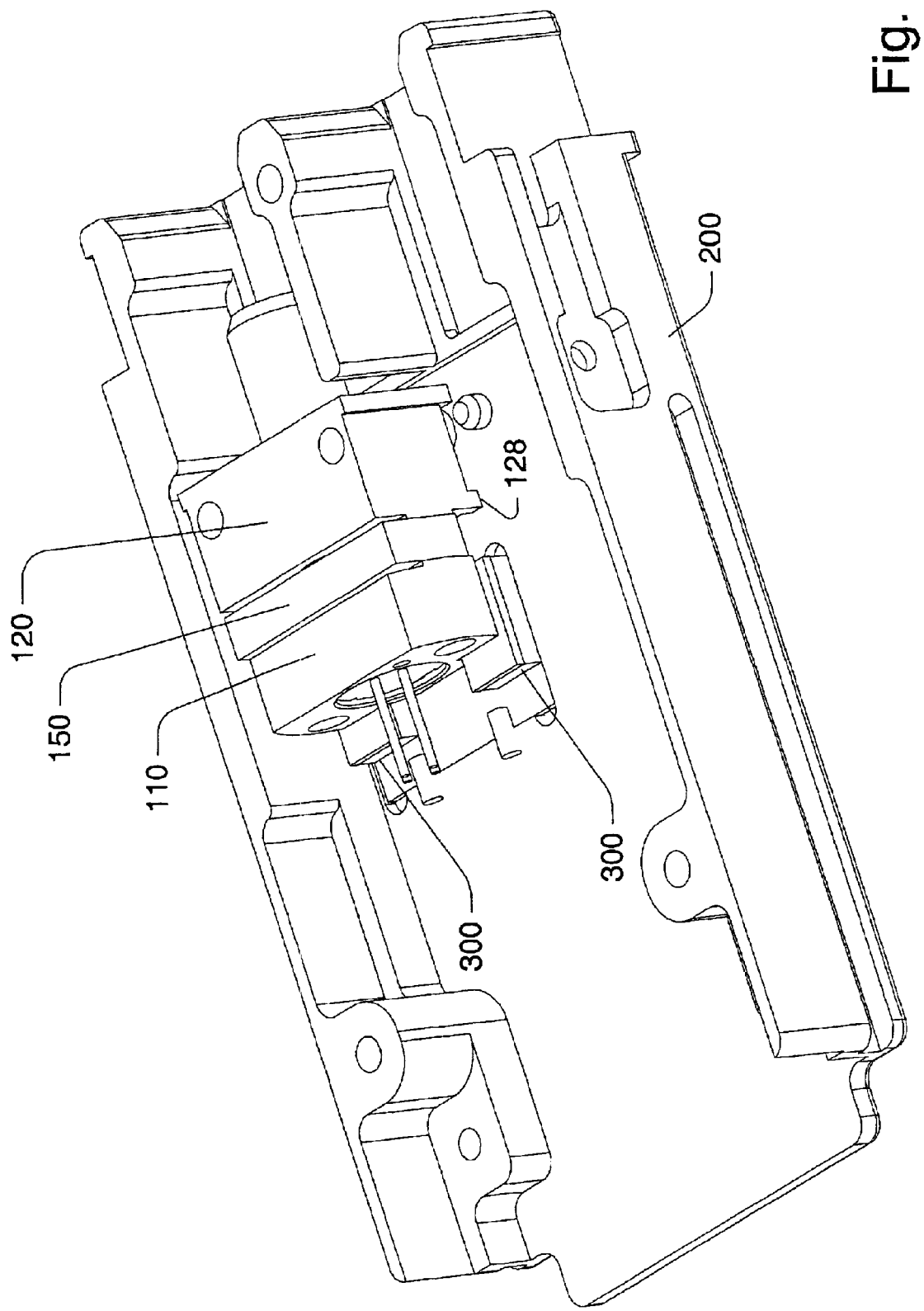
FIG. 5 depicts the TOSA of FIG. 1 disposed on a portion of a transceiver module housing in furtherance with an embodiment of the present invention.

FIG. 5 depicts the TOSA 100 disposed on a bottom portion of an optoelectronic transceiver module housing 200 in furtherance of an embodiment of the present invention. The module housing 200 is preferably made of metal for heat dissipation. A top portion of the module housing 200, the Receiver Optical Sub-assembly (ROSA), and printed circuit board(s) containing electronic circuitry are not illustrated in FIG. 5. In the present embodiment, the physical dimensions of the module housing 200 are as follows: width, 3 cm or less; length, 6.5 cm or less, and height, 1.2 cm or less. A GBIC standard (SFF-8053 GBIC standard version 5.5) requires the dimensions of a module housing to be approximately 3 cm×6.5 cm×1.2 cm. Thus, the module housing 200 of this embodiment meets the form factor requirements of the GBIC standard.

In another embodiment, the physical dimensions of the module housing are: width, 0.54 inches or less; length, 2.24 inches or less; and height, 0.34 inches or less. The SFP MSA (Small Form Factor Pluggable Multisource Agreement) requires the dimensions of a compliant module housing to be approximately 0.54"×2.24"×0.34". Thus, the module housing in that embodiment meets the form factor requirements of the SFP standard. Note that the present invention is not limited to the form factor requirements described above. A person of ordinary skill in the art having the benefit of this disclosure will appreciate that the present invention is adaptable to various existing or yet to be determined form factors, some of which can be smaller.

The laser mount structure 110 is not in direct contact with the module housing 200. Specifically, the laser mount structure 110 is separated from the top portion of the module housing 200 by a gap when the module housing 200 is assembled. Further, the laser mount structure 110 is separated from the bottom portion of the module housing 200 by a temperature controller 300. Although the optical fiber receptacle structure 120 is in direct contact with the module housing 200, protrusions 128 of the optical fiber receptacle structure 120 act as spacing elements and reduce the contact area between the structure 120 and the module housing 200.

The temperature controller 300, preferably a thermal-electric cooler (TEC), is disposed between the laser mount structure 110 and the bottom portion of the module housing 200. In one embodiment, a layer of thermal grease forms a compliant, thermally-conductive interface between the temperature controller 300 and the laser mount structure 110. The temperature controller 300 is configured to indirectly regulate the temperature of the laser emitter within the laser package 115 by transferring heat between the laser mount structure 110 and the module housing 200. Operation of the temperature controller 300 does not directly regulate the temperature of the optical fiber receptacle structure 120, due to the thermal break 150 between the laser mount structure 110 and the optical fiber receptacle structure 120. In addition, due to the thermal isolation provided by the small amount of contact area between the optical fiber receptacle 120 and the module housing 200, heat is transferred very slowly from the module housing 200 to the optical fiber receptacle structure 120. The combined effect of the thermal break 150 and the small contact area between the optical fiber receptacle structure 120 and the module housing 200 is that the temperature controller 300 does not substantially affect the temperature of the optical fiber receptacle structure 120.

The thermal break 150, the ceramic washers 172, the gap between the top portion of the module housing 200 and the laser mount structure 110, and the protrusions 128 together provide thermal isolation for the laser mount structure 110. In most transceivers, such a thermal break would be undesirable because a significant amount of heat generated by the laser would build up in and around the laser mount structure. But in the absence of the thermal break 150, a "thermal short" (e.g., a path of high thermal conductivity) among the laser mount structure 110, the temperature controller 300, the module housing 200, and the optical fiber receptacle structure 120 will be formed. That is, heat drawn from the laser mount structure 110 would flow through the module housing 200 and the optical fiber receptacle structure 120, and the heat would be recycled back into the laser mount structure 110. In that case, the effectiveness and efficiency of the temperature controller 300 would be very low and might not be able to adequately regulate the temperature of the laser package 115.

According to the present embodiment, the thermal isolation breaks up the "thermal short" between the laser mount structure 110 and other components of the optoelectronic transceiver module, and relieves the temperature controller 300 of the responsibility of heating or cooling non-temperature critical portions of the optoelectronic transceiver module. Consequently, a temperature controller that is sufficiently compact to fit inside the housing 200 may be used. In addition, because the temperature-critical portions of the optoelectronic transceiver module make up a very small portion of the transceiver module (e.g., less than 5% of the mass of the transceiver 100 is contained within the laser mount structure 110 and laser package 115 in the preferred embodiments), the amount of power required by the temperature controller 300 will be limited. Thus, the temperature-controlled transceiver module according to the present invention meets the power consumption restrictions of certain transceiver module standards.

FIG. 6 is a block diagram illustrating circuitry that may be used in conjunction with embodiments of the present invention. As shown in FIG. 6, the temperature controller 300 and the thermistor 160 are coupled to a control circuit 310, which compares the measured temperature against a reference temperature and generates control signals based on the temperature difference. The control signals are then provided to a drive circuit 320, which generates a drive current for the temperature controller 300 according to the control signals. A control circuit that may be used is described in greater detail in the above-mentioned co-pending patent application(s).

The present invention, an optoelectronic module with thermally isolated components, has thus been disclosed. The foregoing descriptions of specific embodiments of the present invention are presented for purposes of illustration and description. The embodiments were chosen and described in order to best explain the principles of the invention and its practical applications, to thereby enable others skilled in the art to best utilize the invention. They are not intended to be exhaustive or to limit the invention to the precise forms disclosed. Obviously, many modifications and variations suitable to the particular use contemplated are possible in view of the above teachings. For instance, although an embodiment configured for a TO laser package is described, in other embodiments the present invention is used in combination with laser packages described in the above mentioned patent application(s). Further, although an optoelectronic transceiver embodiment is described, it should be apparent to those of ordinary skill in the art having the benefit of this disclosure that embodiments of the present invention include optoelectronic transmitter modules and other apparatuses.

What is claimed is:

1. An apparatus, comprising:
    a housing;
    a first structure disposed in the housing, the first structure configured to affix an optically active component within the housing;
    a second structure disposed adjacent to the first structure in the housing and configured to receive an optical fiber;
    a thermal isolator disposed within the housing between the first structure and the second structure to separate at least a portion of the second structure from the first structure and to substantially reduce heat conduction between the first structure and the second structure; and
    a temperature controller coupled to the first structure and operable to regulate temperature of the optically active component without regulating temperature of the second structure;
    further comprising:
    a fastener that affixes the first structure, the thermal isolator and the second structure; and
    a ceramic washer configured to provide thermal isolation between the fastener and the first structure.

2. The apparatus of claim 1, wherein the temperature controller comprises a thermal-electric cooler.

3. The apparatus of claim 1, wherein the thermal isolator comprises a piece of ceramic having low thermal conductivity.

4. The apparatus of claim 1, wherein the second structure comprises spacing elements configured to reduce conduction of heat between the second structure and the housing.

5. The apparatus of claim 1, further comprising a thermistor coupled to the first structure and operable to provide a close estimation of a temperature of the optically active component.

6. The apparatus of claim 1, wherein the optically active component comprises a laser emitter.

7. An apparatus, comprising:
    a housing;
    a laser mount structure disposed in the housing;
    a laser package disposed in the laser mount structure, the laser packaging having a laser emitter;
    a thermistor disposed proximally to the laser package operable to provide an estimation of a temperature of the laser emitter;
    an optical fiber receptacle structure disposed adjacent to the laser mount structure and configured to receive an optical fiber;
    a thermal isolator disposed within the housing and affixed between the laser mount structure and the optical fiber receptacle structure to separate at least a portion of the optical fiber receptacle structure from the laser mount structure and to substantially reduce conduction of heat between the laser mount structure and the optical fiber receptacle structure; and
    a thermal-electric cooler coupled to the laser mount structure and operable to regulate temperature of the laser without regulating temperature of the optical fiber receptacle structure;

comprising:

a screw that affixes the laser mount structure, the thermal isolator and the optical fiber receptacle structure; and a ceramic washer configured to provide thermal isolation between the screw and the laser mount structure.

8. The apparatus of claim 7, wherein the thermal isolator comprises a piece of ceramic having low thermal conductivity.

9. The apparatus of claim 7, wherein the optical fiber receptacle structure comprises spacing elements configured to reduce conduction of heat between the optical fiber receptacle structure and the housing.

10. A transmitter optical sub-assembly comprises:

a laser mount structure;

a laser package disposed in the laser mount structure, the laser package having a laser emitter disposed therein;

an optical fiber receptacle structure coupled to the laser mount structure and configured to receive an optical fiber;

a thermal isolator disposed between the laser mount structure and the optical fiber receptacle structure to separate at least a portion of the optical fiber receptacle structure from the laser mount structure and to substantially reduce conduction of heat between the laser mount structure and the optical fiber receptacle structure;

a fastener that affixes the laser mount structure, the thermal insulator and the optical fiber receptacle structure; and a ceramic washer configured to provide thermal insulation between the fastener and the laser mount structure.

11. The transmitter optical subassembly of claim 10 further comprising a temperature controller coupled to the laser mount structure and operable to regulate temperature of the laser emitter without regulating temperature of the optical fiber receptacle structure.

12. The transmitter optical subassembly of claim 11, wherein the temperature controller comprises a thermal-electric cooler.

13. The transmitter optical subassembly of claim 10, wherein the thermal insulator comprises a piece of ceramic having low thermal conductivity.

14. The transmitter optical subassembly of claim 10, further comprising a thermistor coupled to the laser mount structure and operable to detect a close estimation of a temperature of the laser emitter.

* * * * *

UNITED STATES PATENT AND TRADEMARK OFFICE
CERTIFICATE OF CORRECTION

PATENT NO. : 6,880,983 B2  Page 1 of 1
APPLICATION NO. : 10/101247
DATED : April 19, 2005
INVENTOR(S) : Stewart et al.

It is certified that error appears in the above-identified patent and that said Letters Patent is hereby corrected as shown below:

<u>Column 3</u>
Line 11, remove [116 (FIG. 6)]

<u>Column 7</u>
Line 3, before "comprising:" insert --further--

Signed and Sealed this

Thirtieth Day of November, 2010

David J. Kappos
*Director of the United States Patent and Trademark Office*